(12) United States Patent
Sun et al.

(10) Patent No.: US 8,985,274 B2
(45) Date of Patent: Mar. 24, 2015

(54) FLATBED LOADING SYSTEM WITH SELF-ALIGNING PLATFORMS

(75) Inventors: Kaiwen Sun, Effingham, SC (US); Ray Cook, Effingham, SC (US); Mark Anthony Perkins, Conway, SC (US); James Thomas Mays, Hartsville, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 167 days.

(21) Appl. No.: 13/606,875

(22) Filed: Sep. 7, 2012

(65) Prior Publication Data

US 2014/0041961 A1 Feb. 13, 2014

Related U.S. Application Data

(60) Provisional application No. 61/682,564, filed on Aug. 13, 2012.

(51) Int. Cl.
*E04G 3/00* (2006.01)
*E04G 3/28* (2006.01)
*E04G 1/22* (2006.01)
*E04G 1/24* (2006.01)

(52) U.S. Cl.
CPC .. *E04G 1/22* (2013.01); *E04G 3/28* (2013.01); *E04G 1/24* (2013.01)
USPC ............. 182/12; 182/62.5; 182/131; 414/401

(58) Field of Classification Search
CPC ...... B65G 69/22; B65G 69/26; B65G 69/001; B64F 5/00; B25H 1/0007; E04G 1/00; E04G 3/28; E04G 1/24
USPC ........... 182/12, 13, 15–17, 19, 36, 62.5, 63.1, 182/115, 130, 131, 222, 223; 414/396, 401, 414/584
See application file for complete search history.

(56) References Cited

U.S. PATENT DOCUMENTS

| | | | | | |
|---|---|---|---|---|---|
| 3,018,495 | A | * | 1/1962 | Hosbein | 14/71.7 |
| 3,138,812 | A | * | 6/1964 | Prosser | 14/71.3 |
| 3,664,459 | A | * | 5/1972 | Stephens et al. | 182/141 |
| 3,824,536 | A | * | 7/1974 | Cherico | 340/436 |
| 3,984,014 | A | * | 10/1976 | Pohl | 414/546 |

(Continued)

OTHER PUBLICATIONS

Tapeswitch Corporation, TS-47 & TS-57 Sensing Edges http://www.tapeswitch.com/Sensing_Edges/ed_ts47_57.html.

(Continued)

*Primary Examiner* — Katherine Mitchell
*Assistant Examiner* — Shiref Mekhaeil
(74) *Attorney, Agent, or Firm* — Dority & Manning, P.A.

(57) ABSTRACT

A mobile platform has a separate and independent linear actuator pivotally connected near each opposite end of the platform where there is a contact limit switch that when triggered by contact with the side of a flatbed, stops movement of the actuator, and thus stops movement of the platform, toward the side of the flatbed. Because each of the two actuators is pivotally connected to its respective end of the platform and moves independently of the other, each end of the platform can stop moving toward the flatbed before or after, depending on how the flatbed is misaligned, the other end of the platform stops moving toward the flatbed. In this way the platform self-aligns to the alignment of the flatbed and avoids the need to reposition a flatbed that is not precisely aligned parallel to the central axis of the loading bay.

14 Claims, 10 Drawing Sheets

(56) References Cited

U.S. PATENT DOCUMENTS

| | | | |
|---|---|---|---|
| 3,987,902 A * | 10/1976 | Burgess et al. | 209/555 |
| 4,293,752 A | 10/1981 | Koenig | |
| 4,296,283 A | 10/1981 | Koenig et al. | |
| 4,358,020 A * | 11/1982 | Thiele | 212/276 |
| 4,367,865 A | 1/1983 | Blair et al. | |
| 4,551,595 A | 11/1985 | Koenig et al. | |
| 4,679,657 A | 7/1987 | Bennett et al. | |
| 4,706,570 A * | 11/1987 | Moro et al. | 105/163.2 |
| 4,758,815 A | 7/1988 | Lovell | |
| 4,787,111 A | 11/1988 | Pacek et al. | |
| 4,823,106 A | 4/1989 | Lovell | |
| 4,987,277 A | 1/1991 | Duhon | |
| 5,042,612 A | 8/1991 | Bennett et al. | |
| 5,118,910 A | 6/1992 | Duhon et al. | |
| 5,260,530 A | 11/1993 | Duhon et al. | |
| 5,363,940 A | 11/1994 | Fahrion | |
| 5,392,878 A | 2/1995 | Bennett et al. | |
| 5,423,396 A | 6/1995 | Fahrion | |
| 5,743,697 A * | 4/1998 | Alexander | 414/401 |
| 5,826,624 A * | 10/1998 | Graser | 139/1 R |
| 6,390,152 B1 | 5/2002 | Donovan et al. | |
| 6,412,199 B1 * | 7/2002 | Quenzi et al. | 37/281 |
| 6,502,267 B2 | 1/2003 | MacDonald et al. | |
| 6,502,709 B1 | 1/2003 | Parker | |
| 6,772,860 B1 | 8/2004 | Nelson | |
| 6,968,963 B1 * | 11/2005 | Zakula et al. | 212/270 |
| 7,134,159 B2 * | 11/2006 | Muhl et al. | 14/71.3 |
| 7,216,741 B2 | 5/2007 | MacDonald et al. | |
| 7,448,470 B2 | 11/2008 | Brown et al. | |
| 7,802,652 B2 | 9/2010 | Bennett et al. | |
| 7,832,525 B2 * | 11/2010 | Bennett et al. | 182/36 |
| 8,051,951 B2 | 11/2011 | Bennett et al. | |
| 8,186,105 B2 * | 5/2012 | Jackson et al. | 52/3 |
| 8,371,070 B2 * | 2/2013 | Jackson et al. | 52/5 |
| 8,499,889 B2 | 8/2013 | DuBose et al. | |
| 2008/0095598 A1 * | 4/2008 | Cotton et al. | 414/401 |

OTHER PUBLICATIONS

Carbis Catalog, 2009.

* cited by examiner

FLATBED LOADING SYSTEM WITH SELF-ALIGNING PLATFORMS

CROSS REFERENCE TO RELATED APPLICATIONS

The present application claims priority to currently U.S. Provisional Patent Application Ser. No. 61/682,564, filed Aug. 13, 2012, which is hereby incorporated herein in its entirety for all purposes.

STATEMENT REGARDING FEDERALLY SPONSORED RESEARCH OR DEVELOPMENT

Not applicable.

FIELD OF THE INVENTION

The subject matter disclosed herein generally involves a system for loading and unloading flatbeds.

BACKGROUND OF THE INVENTION

Flatbeds are used for transporting cargo and can take several forms such as flatbed trucks, detachable flatbed trailers and flatbed rail cars. These flatbeds are maneuvered into a loading bay where the cargo can be loaded onto the flatbed or unloaded from the flatbed. These loading bays can include a flatbed servicing station that provides a mobile elevated workers' platform with an elongated deck as described in U.S. Pat. No. 7,832,525, which is incorporated herein by this reference. The platform is selectively moved toward and away from a flatbed and has safety features for stopping movement of the platform toward the flatbed when a foreign object is detected between the platform and the flatbed. A plurality of side-by-side safety gates is provided on the side of the deck adjacent the flatbed, and a guard gate is provided that can be positioned across the rear of the flatbed.

Nonetheless, unless the sides of the flatbed are aligned precisely parallel to the sides of the mobile elevated workers' platform, there will be gaps between the sides of the flatbed and the sides of the platform. These gaps can occur for example when the flatbed is backed into a loading bay at a slight angle and can pose hazards to the workers that load or unload the flatbed. Pulling the flatbed out of the loading bay and backing it back into the loading bay again takes time and can idle the workers waiting to load or unload the flatbed. Sometimes these gaps are not noticed until after the tractor is detached from a detachable flatbed trailer, resulting in further idleness while a suitable tractor is re-attached to the flatbed trailer before the flatbed trailer can be repositioned in a parallel alignment with the deck of the mobile elevated workers' platform.

BRIEF DESCRIPTION OF THE INVENTION

Some of the aspects and advantages of the invention are set forth below in the following description, or may be obvious from the description, or may be learned through practice of embodiments of the invention.

One embodiment of the invention includes a mobile platform with a separate and independent linear actuator pivotally connected near each opposite end of the platform where there is a limit switch that when triggered automatically by approach of the first opposite end of the platform into flush contact with the side of the flatbed, stops movement of the actuator, and thus stops movement of the platform, toward the side of the flatbed. As used herein, flush means without a gap large enough for a worker's foot to fit into such gap. Because each of the two actuators is pivotally connected to its respective end of the platform and moves independently of the other, each end of the platform can stop moving toward the flatbed before or after, depending on how the flatbed is misaligned, the other end of the platform stops moving toward the flatbed. In this way the platform automatically self-aligns to the alignment of the flatbed and flush contact therewith and thus avoids the need to reposition a flatbed that is not precisely aligned parallel to the central axis of the loading bay or the inboard side of the platform.

An alternative embodiment of the invention further includes a mechanism for raising and lowering the height of the platform with respect to the ground according to the desires of the user.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in this specification, including reference to the accompanying figures, in which.

Figure 1:
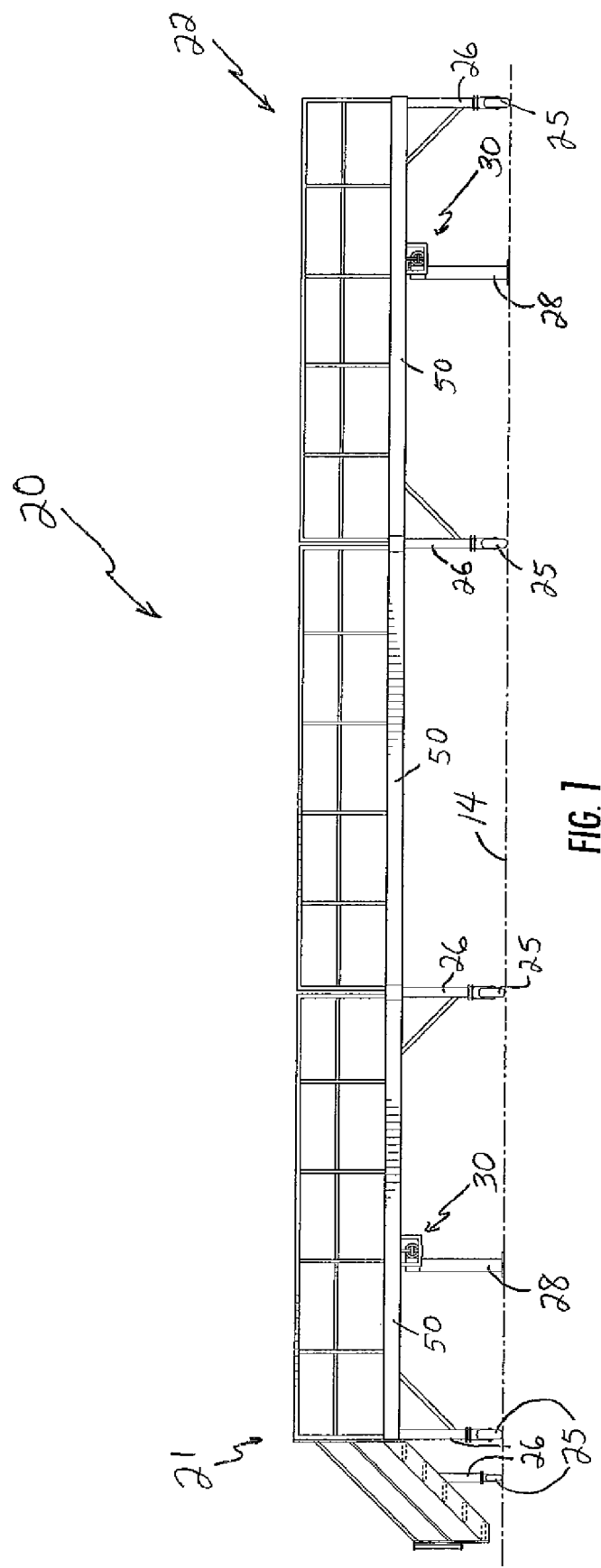
FIG. 1 is a front plan view of the inboard side of an embodiment of a component of the present invention.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to exemplary embodiments of the invention, one or more examples of which are illustrated in the accompanying drawings. The detailed description uses numerical and letter designations to refer to features in the drawings. Like or similar designations in the drawings and description have been used to refer to like or similar parts.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
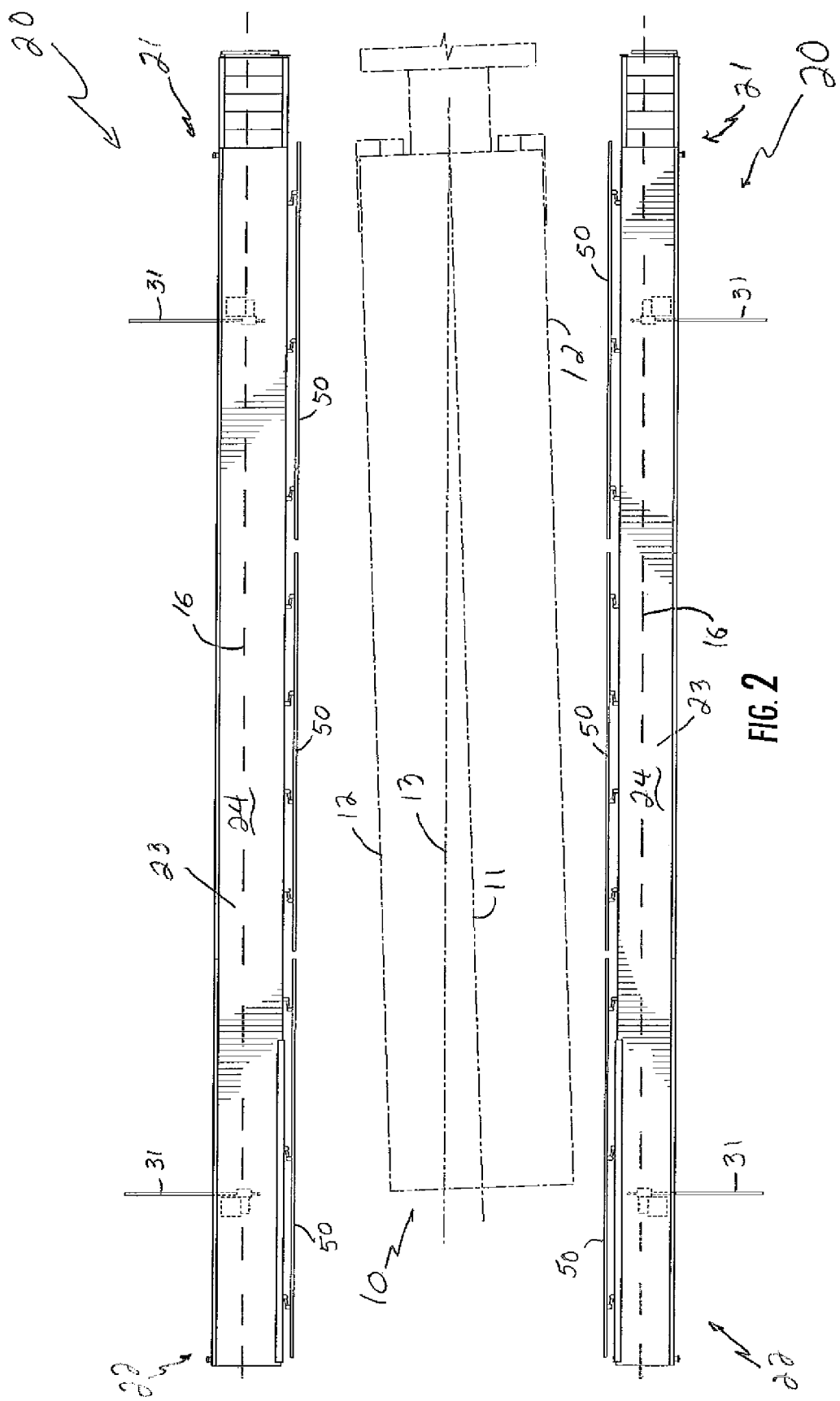
FIG. 2 is a top plan view of an embodiment of the present invention depicted in a retracted position from a flatbed that is outlined in phantom in single dashed line with its central axis outlined in double chain dashed line and the centerline of the loading bay shown in double chain dashed line.

As shown in FIG. 2 in a top plan view for example, a flatbed 10 drawn in phantom in chain dashed line is indicated generally by the numeral 10 and has an elongated support member. As shown in phantom in FIGS. 2 and 4 for example, the flatbed 10 is defined by a pair of elongated opposed straight sides 12. As shown in FIG. 2 for example, the central axis 11 of the flatbed 10 is disposed at an angle with respect to the central axis 13 of the loading bay in which the flatbed 10 has been positioned.

An apparatus for facilitating loading and unloading access to a flatbed 10 having an elongated support member that is defined by a pair of elongated opposed straight sides 12 is provided in accordance with the present invention. As embodied herein, the apparatus of the present invention includes at least one mobile platform that is provided with a separate and independent linear actuator near each opposite end of the platform. One linear actuator is pivotally connected to the platform near one end of the platform, and a second linear actuator is pivotally connected near the other end of the platform. Each opposite end of the platform also is provided with its own independent limit switch that controls shut-off of the linear actuator closest to that switch. When a limit switch is triggered automatically by approach of the first opposite end of the platform into flush contact with the side 12 of the flatbed 10, linear movement of the linear actuator toward the flatbed 10 is stopped. Once the linear actuator stops, the end of the platform that is associated with the triggered limit switch stops moving toward the side 12 of the flatbed 10 responsible for triggering that limit switch.

An embodiment of the platform in a plan view looking at the inboard side of the platform is shown in FIG. 1 and generally designated by the numeral 20. The inboard side of the platform 20 is the side that is intended to face the flatbed 10 that typically will be positioned between two platforms 20. As schematically shown in top plan views in FIGS. 2 and 3 and in a rear plan view shown in FIG. 4, the apparatus of the present invention desirably includes a pair of platforms 20, wherein each platform 20 is opposed to the other platform 20 and is a mirror image of the other platform 20 in this disposition. Because the components of interest in each platform 20 are the same as in the other opposed platform 20, the remaining discussion will be focused on one of the platforms 20 in detail with any differences between opposing platforms 20 explained below where appropriate.

Figure 3:
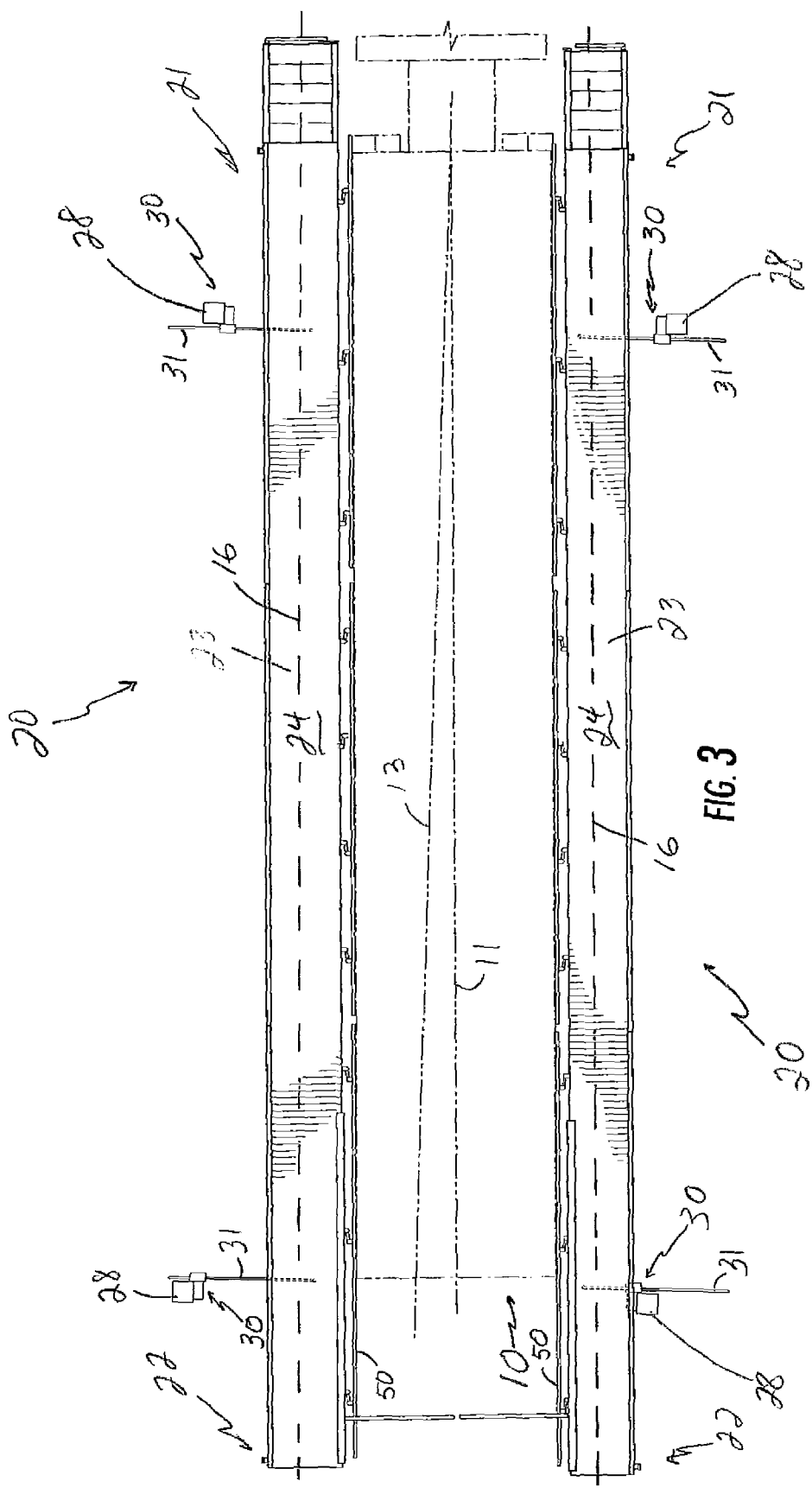
FIG. 3 is a top plan view of an embodiment of the present invention depicted in an enclosed position against a flatbed that is outlined in phantom in single dashed line with its central axis outlined in double chain dashed line and the centerline of the loading bay shown in double chain dashed line.
Figure 4:
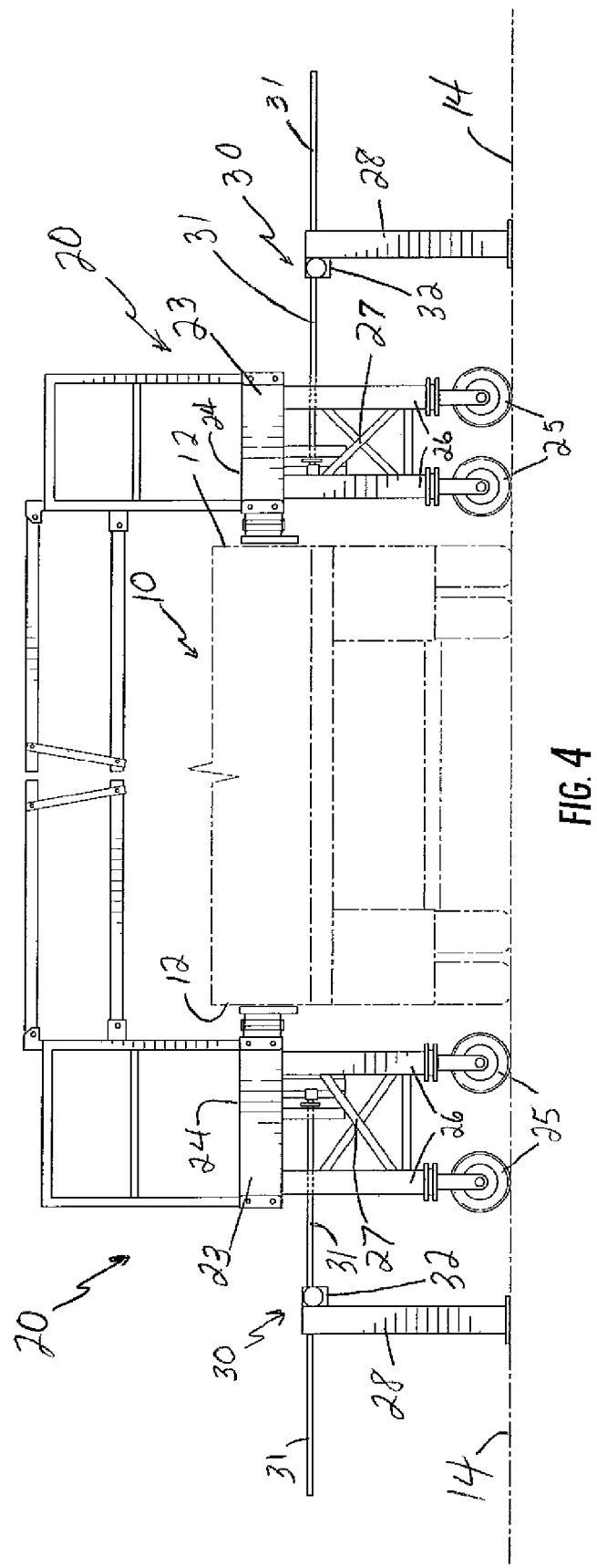
FIG. 4 is a rear plan view of an embodiment of the present invention depicted in an enclosed position against a flatbed that is outlined in phantom in single dashed line.

As embodied herein and shown in dashed line in FIGS. 1, 2 and 3 for example, a platform 20 is elongated along a lengthwise axis 16 (not shown in FIG. 1), which is disposed parallel to the central axis 13 of the loading bay in FIG. 2 and parallel to the central axis 11 of the flatbed 10 in FIG. 3. As shown generally in FIGS. 1-3, the platform 20 defines a first end 21 and a second end 22 that is axially opposite the first end 21. As shown in FIGS. 2, 3, 4 and 5 for example, the platform 20 further defines an axially elongated deck 23 having an upper surface 24 that is configured to carry the weight of workers and cargo moving between the platform 20 and the flatbed 10. As shown in FIG. 4 for example, the width of the platform's deck 23 can vary such that the width of one platform 20 is narrower than the width of the opposing platform 20. In environments where there are loading bays side-by-side, it is sometimes desirable that two platforms 20 situated back-to-back with the respective outboard sides in opposition should have a somewhat narrower width, and so the deck 23 of such narrower platforms 20 desirably has a width on the order of 2.5 feet for example. Otherwise, a typical width of a deck 23 of a platform 20 is about 3 feet.

Figure 7A:
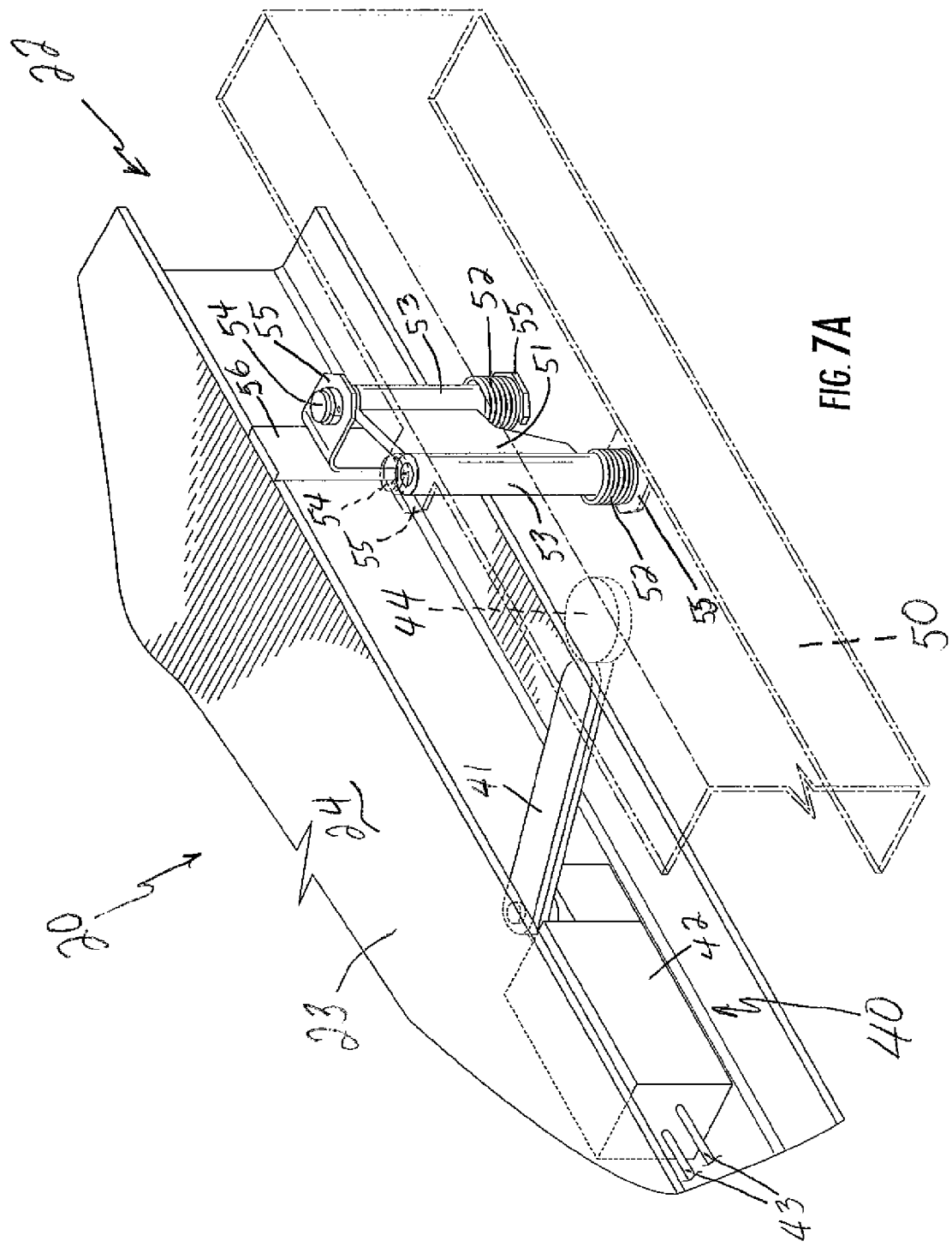
FIG. 7A is an elevated perspective view of components of an embodiment of the present invention with some components shown in phantom in chain dashed line.

As schematically shown in FIG. 7A for example, the inboard side of the deck 23 of the platform 20 desirably can be configured with a channel that has a C-shaped transverse cross-sectional shape, which can be supplied by a metal I-beam forming the inboard side of the deck 23. As shown in FIGS. 1 and 4 for example, the deck 23 of the platform 20 desirably is carried by a frame that is rendered mobile by a plurality of wheels 25, which are rotatably carried by the lower legs 26 of the frame. As schematically shown in FIG. 4 for example, some embodiments of the platform's frame can include a conventional height adjusting mechanism 27 that is configured to permit the user to raise and lower the elevation of the upper deck 23 of the platform 20 with respect to the surface 14 beneath the wheels 25.

Figure 5:
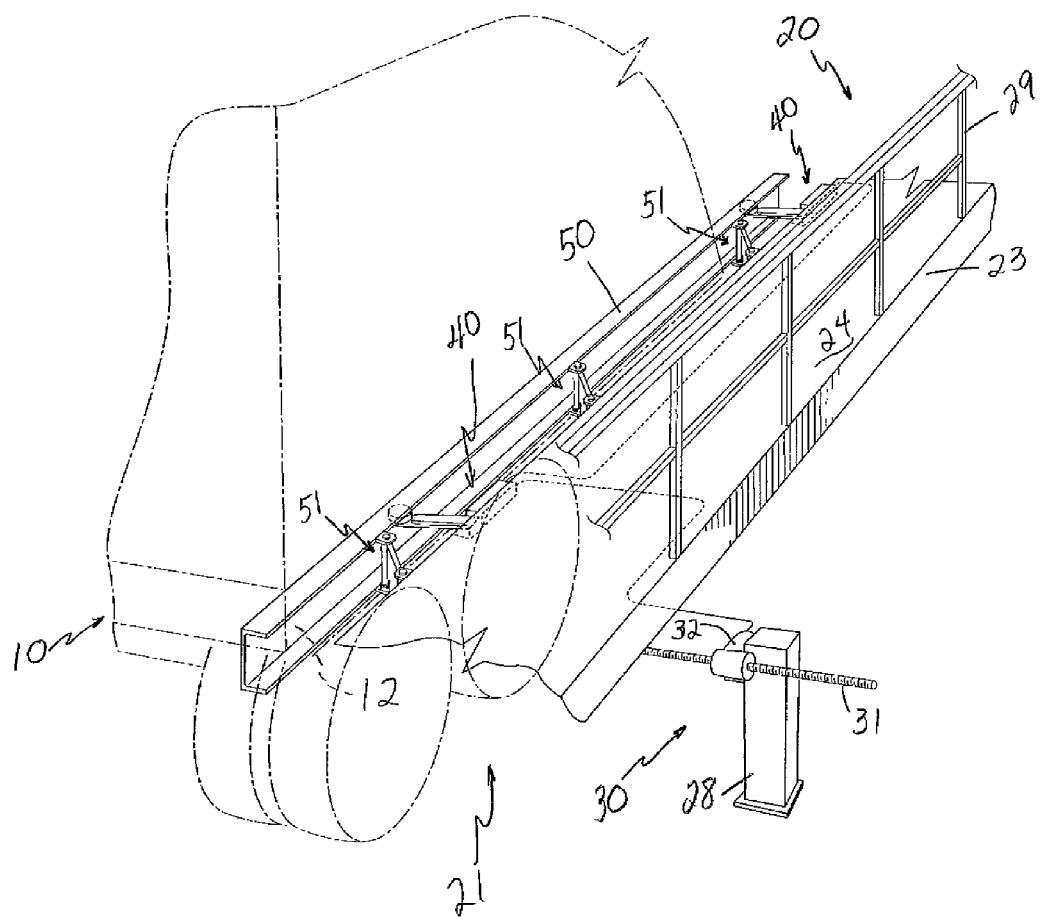
FIG. 5 is an elevated perspective view of components of an embodiment of the present invention with portions of a flatbed shown in phantom in chain dashed line.
Figure 6A:
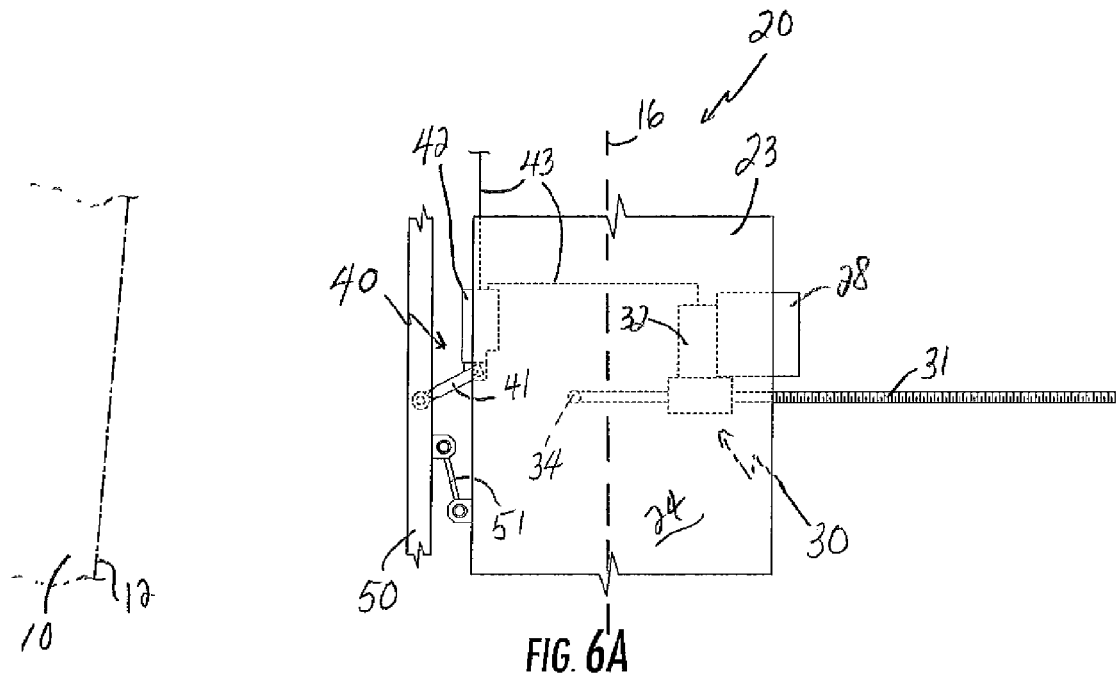
FIG. 6A is an elevated perspective view of components of an embodiment of the present invention with some components shown in phantom in chain dashed line.
Figure 6B:
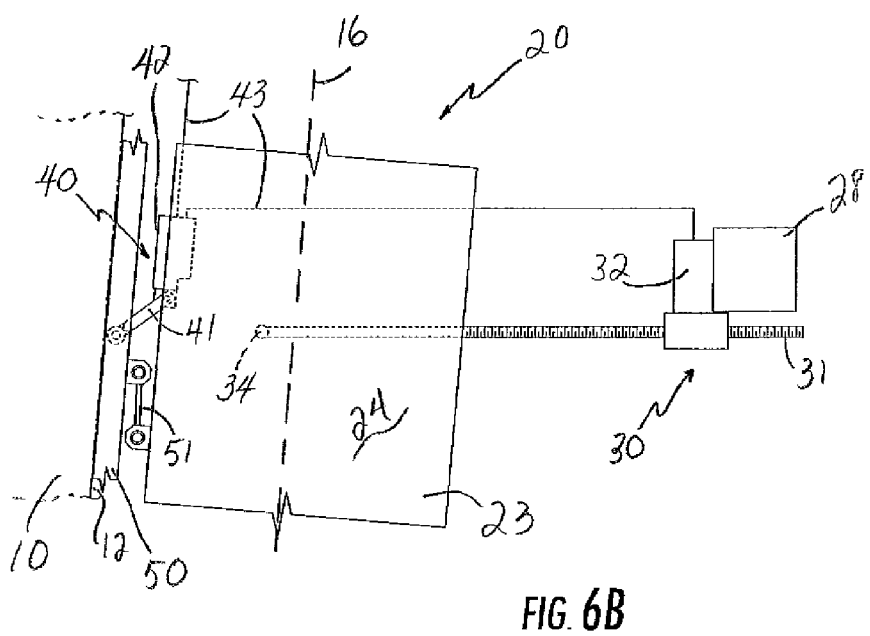
FIG. 6B is another elevated perspective view of components of an embodiment of the present invention shown in FIG. 6A with some components shown in phantom in chain dashed line.
Figure 6C:
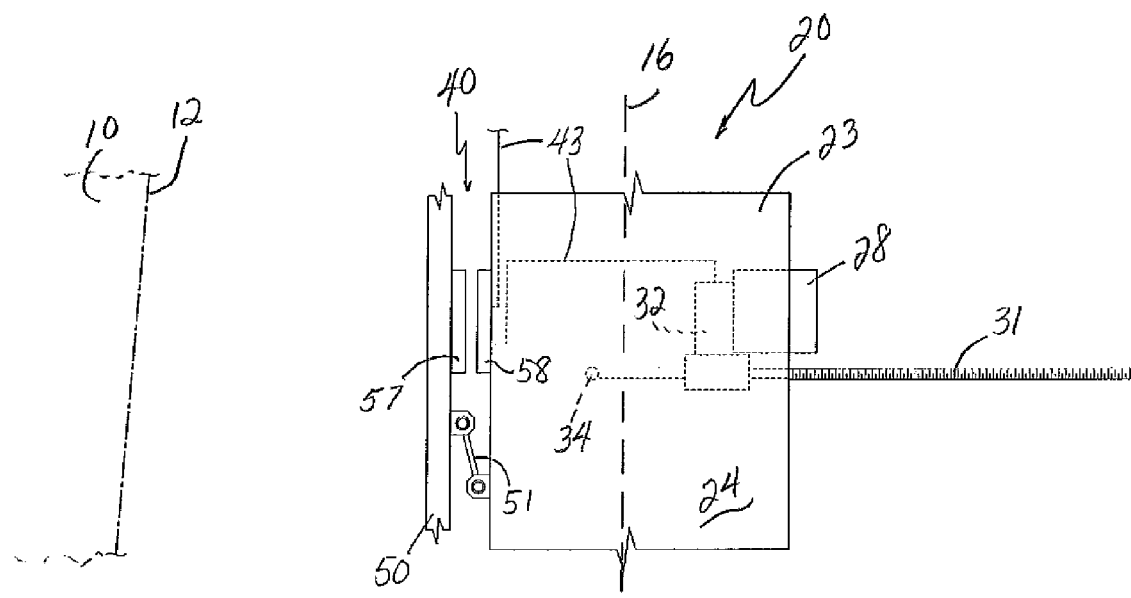
FIG. 6C is an elevated perspective view of components of an embodiment of the present invention with some components shown in phantom in chain dashed line.
Figure 6D:
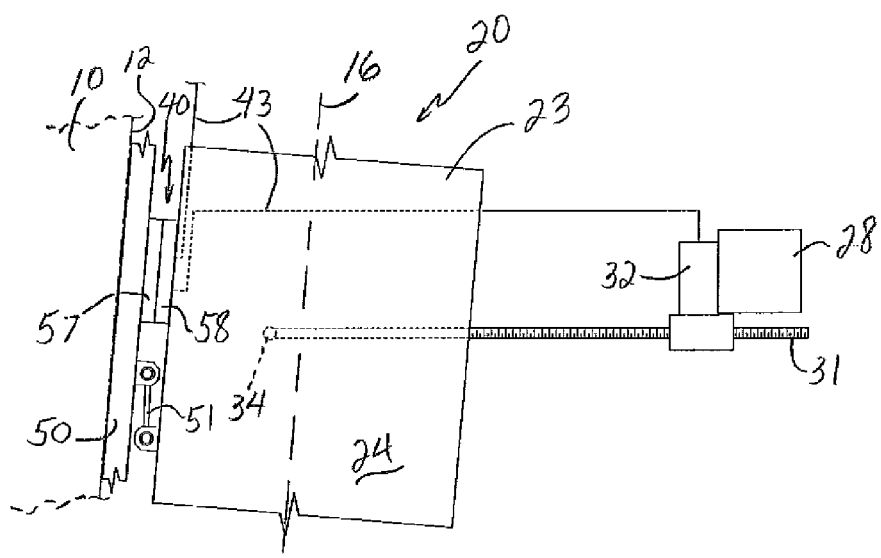
FIG. 6D is another elevated perspective view of components of an embodiment of the present invention shown in FIG. 6A with some components shown in phantom in chain dashed line.

As schematically shown in FIGS. 1, 3, 4 and 5 for example, the apparatus of the present invention desirably includes a first linear actuator generally designated by the numeral 30 that is mounted on a fixed stanchion 28, which as shown in FIGS. 1 and 4 is fixed in place to the surface 14 beneath the wheels 25. As schematically shown in FIGS. 1, 3, 4 and 5 for example, the apparatus of the present invention desirably includes a second linear actuator 30 that is spaced apart from and operates independently of the first linear actuator 30. As shown in FIGS. 1 and 0.3 for example, the second linear actuator 30 also is mounted on a second stanchion 28, which as shown in FIGS. 1 and 4 is fixed in place to the surface 14 beneath the wheels 25. As shown schematically in FIGS. 6A, 6B, 6C and 6D for example, each linear actuator 30 is provided with a member 31 that is configured to move in a horizontal plane in a direction that is generally perpendicular to the lengthwise axis 16 of the platform 20. This linearly moveable member 31 also is configured to move in a direction that is generally perpendicular to the stanchion 28. As schematically shown in FIGS. 4 and 5 for example, each linear actuator 30 desirably includes a reversible motor 32 that propels the linearly moveable member 31 toward and away from the motor 32 and the stanchion 28 in this horizontal plane. As schematically shown in FIGS. 6A and 6C for example, each reversible motor 32 can propel the linearly moveable member 31 in a direction that is generally normal to the lengthwise axis 16 of the platform 20. However, as schematically shown in FIGS. 6B and 6D for example, each reversible motor 32 can propel the linearly moveable member 31 in a direction that is generally at an angle with respect to the lengthwise axis 16 of the platform 20 and thus neither normal nor parallel to that axis 16.

In the embodiment shown in FIG. 5 for example, the linear actuator 30 desirably can take the form of a reversible screw jack 30. However, other types of linear actuators 30 can be used and alternatively can include for example a reversible scissors jack, a two-way pneumatic cylinder, or two-way hydraulic cylinder. As shown in FIGS. 4 and 5 for example, the reversible screw jack 30 desirably includes a screw rod 31 that moves in a straight line in a horizontal direction toward and away from the stanchion 28 and the motor 32, which in this embodiment desirably is an electric motor 32. To avoid unnecessarily overcrowding the drawings, the electric power source, wiring and wiring harnesses for providing electric power to the electric motors 32 have not been illustrated, as these are conventional.

In accordance with the apparatus of the present invention, each of the linear actuators 30 is pivotally connected to the platform 20 at one of two spaced apart locations toward one of the ends of the platform 20. As shown in FIGS. 1-3 for example, a first linear actuator 30 has one end pivotally connected to the platform 20 near a first one of the opposite ends 21, 22 of the platform 20. A second linear actuator 30 has one end that also is pivotally connected to the platform 20. However, the second linear actuator 30 is pivotally connected near the second opposite end 21, 22 of the platform 20.

Figure 8:
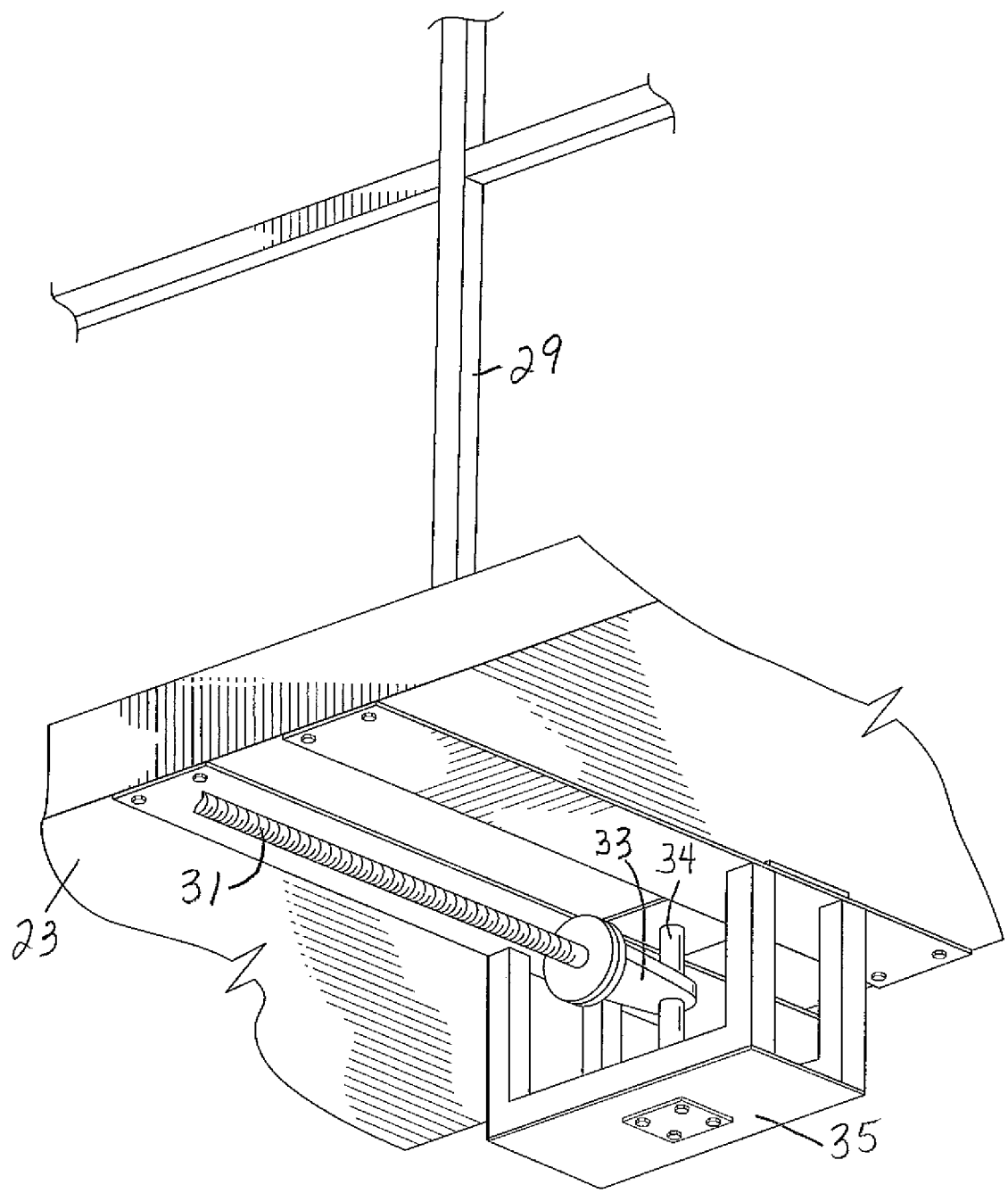
FIG. 8 is an elevated perspective view of components of an embodiment of the present invention.

In an embodiment shown in FIG. 8 for example, the forward end of the linearly moving member 31, such as screw rod 31, desirably has a linkage 33 that pivotally engages a pivot rod 34 that is connected to the platform 20 nearer the inboard side of the platform 20 than the outboard side of the platform 20. Moreover, the linkage 33 is configured so that it is slideable in a direction that is normal to the plane in which the linkage 33 can be pivoted about the pivot rod 34. The linkage 33 is provided with an opening that is configured to receive therein the vertically extending pivot rod 34. The opening is configured to allow the linkage 33 to pivot around the central axis of rotation of the pivot rod 34 and slide up and down on the pivot rod 34 if the platform 20 should be raised and/or lowered. The linkage 33 desirably can include a rotating bearing.

Thus, as shown in FIG. 8 for example, the linkage 33 is pivotally secured by the pivot rod 34 that extends through the opening in the forward end of the linkage 33. The pivot rod 34 is secured to the bottom of a bracket 35, which desirably is fixedly secured to the underside of the main walking deck 23 of the platform 20. Desirably, as shown in FIG. 8 for example, each of these pivotal connection locations is disposed closer to the inboard side of the platform 20, the railing 29 being located at the outboard side of the platform 20. In this way, this end of the platform 20 is free to pivot with respect to the linear actuator 30 as the linear actuator's motion toward and away from the stanchion 28 takes place. Moreover, this end of the platform 20 retains its freedom to pivot when the deck 23 of the platform 20 is raised and lowered because the pivot rod 34 can slide vertically up and down through the opening in the linkage 33 as the deck 23 of the platform 20 is raised and lowered to different heights with respect to the surface 14 beneath the wheels 25.

Each of the first and second linear actuators 30 desirably operates and is constructed in the same manner, but there could be different types of linear actuators 30 on each opposite end of the platform 20 if desired. Only the relative positioning of each linear actuator 30 differs, with one linear actuator 30 being positioned near one of the opposite ends 21, 22 of the platform 20 and the other linear actuator 30 being positioned near the opposite end 21, 22 of the platform 20. The distance between the actuator's pivot point connection to the platform 20 via the pivot rod 34 and the nearest end 21 or 22 of the platform 20 generally is guided by the relative length of the platform 20. As a general rule, the shorter the length of the platform 20 then the closer the pivot point 34 should be to the nearest end 21 or 22 of the platform 20. Thus, longer platforms 20 can tolerate the placement of the actuator's pivot point farther distances away from the nearest end 21 or 22 of the platform 20 and still enable the platform 20 to attain acceptably parallel alignments with the side 12 of the flatbed 10. In one exemplary embodiment, a platform measuring about 53 feet in length and in a range of about 2.5 feet to 3 feet in width might reasonably have the pivot rods 34 defining the pivot points of the two linear actuators 30 separated by a lengthwise distance of about 40 feet and with each linear actuator disposed about the same distance from the midpoint of the length of the platform 20.

As embodied herein, the apparatus of the present invention desirably includes at least a first limit switch 40 and at least a second limit switch 40. As schematically shown in FIG. 5 for example, each limit switch 40 desirably is carried by the platform 20. As schematically shown in FIG. 5 for example, at least a first limit switch 40 is carried by the platform 20 near the first opposite end 21 of the platform 20. Though not shown in the view depicted in FIG. 5, at least a second limit switch 40 similarly is carried by the platform 20 near the second opposite end 22 of the platform 20. Each limit switch 40 desirably is configured so that when triggered automatically by approach of the first opposite end 21 or 22 of the platform 20 into flush contact with the side 12 of the flatbed 10, movement of the linear actuator 30 associated with that limit switch 40 stops, which in turn then immediately stops movement of the end 21, 22 of the platform 20 associated with that linear actuator 20 toward the side 12 of the flatbed 10.

Each limit switch 40 desirably can be provided in the form of a contact limit switch. One example of a contact limit switch is a pivoting arm and follower type of contact limit switch 40 such as schematically shown in FIGS. 6A, 6B, 7A and 7B for example. Another example of a contact limit switch is a type of so-called "strip" switch 40 such as schematically shown in FIGS. 6C and 6D for example. Contact limit switches typically are triggered by some sort of physical contact between the side 12 of the flatbed 10 and the platform 20 that eventually results in the first opposite end 21 or 22 of the platform 20 or component thereof coming into flush contact with the side 12 of the flatbed 10.

Figure 7B:
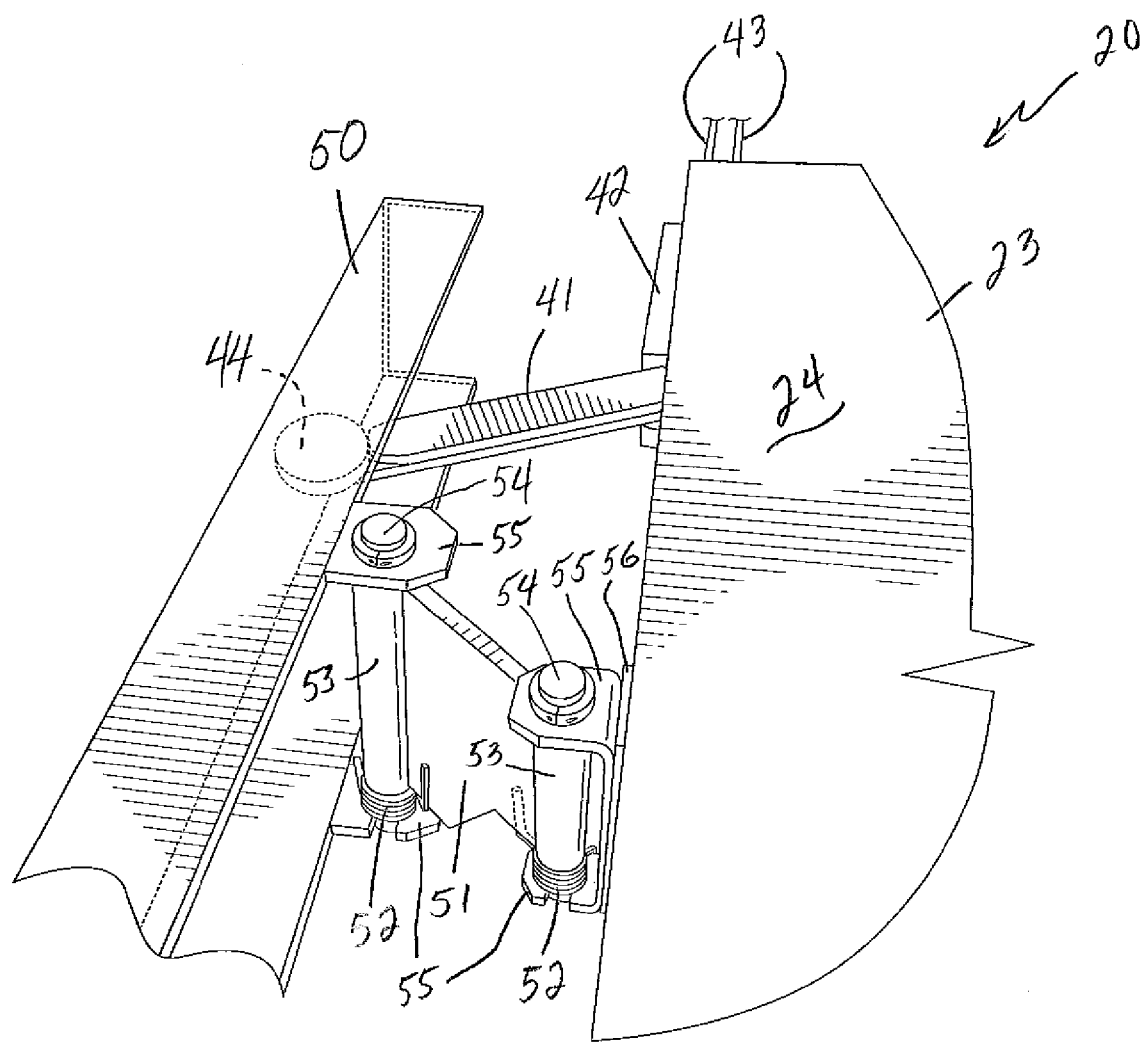
FIG. 7B is another elevated perspective view of components of an embodiment of the present invention shown in FIG. 6A with some components shown in phantom in chain dashed line.

As schematically shown in FIG. 5 for example, the platform desirably includes a bumper rail 50, and contact of the platform 20 with the side 12 of the flatbed 10 desirably is effected via one or more bumper rails 50. As schematically shown in FIGS. 7A and 7B, each bumper rail 50 desirably can be configured with an elongated beam having a C-shaped transverse cross-sectional shape. As shown in FIG. 2 for example, the platform 20 desirably includes at each opposite end of the platform, an axially elongated bumper rail 50. A typical length of a bumper rail 50 disposed at each opposite end 21, 22 of a platform 20 measuring about 53 feet in length is about 17.5 feet. Depending on the length of the platform 20, the platform 20 can include one or more additional bumper rails 50 disposed between the bumper rails 50 disposed toward the respective ends 21, 22 of the platform 20. A typical length of a bumper rail 50 disposed between the rails 50 disposed at each opposite end 21, 22 of the platform is about half the length of the end bumper rails 50 or about 8.75 feet. Though the middle bumper rail 50 shown in FIG. 2 is the same length as the two end bumper rails 50, the middle bumper rail 50 can be replaced with two bumper rails 50 of half that length to better accommodate flatbeds 10 of shorter lengths.

Desirably, each bumper rail 50 will be disposed to engage with at least one limit switch 40, and at least one limit switch 40 desirably is provided for each length of bumper rail 50 measuring about 8.75 feet. Accordingly, as shown in FIG. 5 for example, two limit switches 40 are provided for the bumper rail 50 at the end 21 of the platform 20, with one limit switch 40 disposed to engage with the bumper rail 50 toward one of the opposite ends of the bumper rail 50 and the other limit switch 40 disposed to engage with the bumper rail 50 toward the remaining opposite end of the bumper rail 50.

As schematically shown in FIG. 7A for example, an exemplary embodiment of a contact limit switch 40 desirably includes a pivoting arm such as a feeler arm 41 that has one opposite end pivotally connected to a junction box 42, from which one or more electrical cables 43 can be connected in series to either another limit switch 40 or to the electrical motor 32 of the linear actuator 30 associated with that limit switch 40. As schematically shown in FIG. 5 for example, at least two limit switches 40 electrically connected in a series electrical circuit that provides power to the drive motor 32 of the linear actuator 30 in the forward direction, i.e., the direction that moves the platform 20 away from the motor 32 and the stanchion 28, desirably are provided for each bumper rail 50 of the platform 20.

In the embodiment shown in FIG. 7A for example, the junction box 42 desirably and conveniently is nested into the C-shaped channel forming the inboard side of the deck 23 of the platform 20. At the opposite end of the pivoting arm 41, a follower such as a roller 44 is rotatably mounted and engages the inside surface of the associated bumper rail 50 and is rotatable with respect thereto. The feeler arm 41 desirably is biased (as by being spring-loaded for example) so as to cause the roller 44 to maintain constant physical contact with the inside surface of the associated bumper rail 50. In the view of FIG. 7A, the distance between the inside surface of the bumper rail 50 and the opposing edge of the platform 20 is on the order of 6.5 inches in one exemplary embodiment. Movement of the feeler arm 41 towards the platform 20 by a predetermined distance, which typically is about half of the distance of the rest position of the feeler arm 41 from the platform 20, opens the electrical circuit that provides electrical power to the motor 32 that drives the screw rod 31 in the forward direction away from the motor 32 and the stanchion 28. Once this electrical circuit is open (or alternatively closed as the case may be according to the configuration of the circuit), the motor 32 that is associated with that limit switch 40 stops, and the end 21 or 22 of the platform 20 that would be moved toward the flatbed 10 by the forward movement of the screw rod 31 of the linear actuator 30 including that motor 32 also stops moving.

The limit switch 40 desirably only forms part of the electrical circuit by which electrical power is provided to power the motor 32 of the linear actuator 30 in the forward direction, which is the direction in which the forward end of the screw rod 31 that is pivotally connected to the platform 20 moves away from the motor 32 and the stanchion 28. In the view of FIGS. 6A and 7A, the limit switch 40 is closed so that power can be supplied uninterruptedly to the motor 32 of the linear actuator 30. When the bumper rail 50 contacts the side 12 of the flatbed 10, the feeler arm 41 begins to pivot-toward the platform 20 until as shown schematically in FIG. 6B for example, the distance between the inside surface of the bumper rail 50 and the opposing edge of the platform 20 has been about halved from what is shown in FIGS. 6A and 7A, whereupon the limit switch 40 is triggered and opened and accordingly shuts off the power to the motor 32 of the linear actuator 30. Moreover, such limit switches 40 can be integrated into circuits in alternative ways so that the desired action of shutting off power to the motor 32 can be triggered upon activation of the limit switch 40 by either opening or closing the limit switch 40.

Having been deprived of power, the linear actuator 30 stops, and the movement of the end 21, 22 of the platform 20 associated with that linear actuator 30 also stops moving toward the flatbed 10 and away from the motor 32 of that linear actuator 30 and the stanchion 28 to which that linear actuator 30 is mounted. However, the other linear actuator 30 associated with the other end 21 or 22 of the platform 20 may still be operating, and if so will continue to do so and move that other end 21 or 22 of the platform 20 toward the flatbed 10 until the limit switch 40 associated with that other end 21 or 22 of the platform 20 is triggered and opened to shut off the power to that other linear actuator 30. Thus, each linear actuator 30 operates independently of the other linear actuator 30.

As shown in FIGS. 7A and 7B, each bumper rail 50 desirably is rendered resiliently pivotable by at least one pivoting member 51, the pivoting member 51 having opposite ends and having one of its ends pivotally connected to the deck 23 of the platform 20 and the other of its ends pivotally connected to the bumper rail 50, wherein each end of the pivoting member 51 is resiliently biased in a position by a spring 52. As shown in FIG. 5 for example, each bumper rail 50 desirably is connected to the side of the platform 20 by a plurality of spaced apart pivoting members 51, which desirably are spring-loaded to resiliently bias the bumper rail 50 away from the inboard side of the platform 20 by a predetermined distance, which desirably is about 6.5 inches in one exemplary embodiment.

As shown in FIGS. 7A and 7B, one end of the pivoting member 51 is pivotally connected to the rear of the bumper rail 50, while the other end of the pivoting member 51 is pivotally connected to the inboard side of the platform 20 and particularly to the inboard side of the deck 23 of the platform 20. As shown in FIGS. 7A and 7B, each of these pivotal connections is biased by its own spring 52 such that movement of the bumper rail 50 toward the inboard side of the platform 20 is opposed by the biasing forces of both springs 52.

As shown in FIGS. 7A and 7B, each of the pivoting members 51 desirably can be formed by a spring-loaded dual-acting hinge. A pivot plate 51 has a hollow sleeve 53 formed as a hollow cylindrically-shaped conduit on each opposed end of the pivot plate 51. One of the cylindrical sleeves 53 rotatably receives therein a pivot post 54 that defines a cylindrical outer surface between opposed ends, which are held in opposed brackets 55 connected to the open flanges of the bumper rail 50. The other cylindrical sleeve 53 rotatably receives therein a pivot post 54 that defines a cylindrical outer surface between opposed ends that are held in opposed brackets 55 connected to a flange 56 that is connected to the inboard side of the platform 20.

When the bumper rails 50 are attached in a manner that enables them to swing in a horizontal plane as depicted in FIG. 2 for example, a gap of sufficient distance to accommodate the horizontal swing must be provided between the opposed ends of adjacent bumper rails 50. Moreover, while these pivoting members 51 depicted in FIGS. 7A and 7B are configured to pivot in a horizontal plane parallel to the side of the platform 20 and the flatbed 10, alternative embodiments include pivoting members 51 that are configured to pivot in a vertical plane above and below the side of the platform 20 and the flatbed 10. These latter embodiments enable the bumper rails 50 to swing vertically instead of horizontally and eliminate the need for a gap between the opposed ends of adjacent bumper rails 50.

FIG. 6A schematically shows in a view from above the platform 20, a portion of the side 12 of the flatbed 10 disposed obliquely with respect to a section of the approaching platform 20, and particularly with respect to the inboard side of a section of the bumper rail 50 of a section of the platform 20. FIG. 6B schematically shows in a view from above a section of the platform 20 similar to the view of FIG. 6A, the self-aligning orientation in which a section of the platform 20, and particularly the inboard side of a section of the bumper rail 50 of a section of the platform 20, has automatically self-aligned to become parallel to and flush with a section of the side 12 of a section of the flatbed 10 by pivoting with respect to the direction of linear forward movement of the linear actuator 30. This pivoting movement occurs as the pivot pin 34 attached to the platform 20 rotates within the opening within the linkage 33 attached on the forward end of the linearly moveable member 31 of the linear actuator 30 as shown in FIG. 8 for example. Upon attaining the self-aligning orientation schematically represented in FIG. 6B, the limit switch 40 has opened the electrical circuit that includes the electrical cable 43 and powers the motor 32, which accordingly has stopped advancing the platform 20 toward the side 12 of the flatbed 10.

FIGS. 6C and 6D schematically present the same conditions respectively as FIGS. 6A and 6B, but for a different embodiment of the limit switch 40. FIGS. 6C and 6D schematically illustrate in a view from above a section of the platform 20 similar to the views of FIGS. 6A and 6B, limit switches 40 that are formed by a so-called "strip" switch or "sensing edge" that would have one contact member 57 mounted directly to the outboard side of a section of the bumper rail 50 and an opposing contact member 58 mounted to the inboard face of a section of the deck 23 of a section of the platform 20, which inboard face would point the flanges of the C-shaped channel inwards instead of outwards as shown in FIG. 7A for example. Physical contact between the two contact members 57, 58 would trigger (turn on or off as the case may be) the electrical switch forming the limit switch 40. In an alternative embodiment that includes a sensing edge schematically shown in FIGS. 6C and 6D, the electrically active pressure sensitive member 58 desirably is carried by the platform 20 and can be triggered by pressure applied by contact with the electrically inert member 57 carried in opposition by the bumper rail 50. The electrically active pressure sensitive member 58 desirably can take the form of a pressure-sensitive electrical switch, and examples of same are described for example in U.S. Pat. Nos. 4,296,283; 4,551, 595; 4,987,277; 5,260,530, the disclosures of each of which are hereby incorporated herein by this reference for all purposes. In further embodiments, the electrically inert member 57 can be omitted altogether, and the electrically active pressure sensitive member 58 can be turned on or off (as the case may be) by direct contact with the bumper rail 50 of a section of the platform 20.

FIG. 6C schematically shows a portion of the side 12 of a portion of the flatbed 10 disposed obliquely with respect to a section of the approaching platform 20, and particularly with respect to the inboard side of a section of the bumper rail 50 of a section of the platform 20. FIG. 6D schematically shows the self-aligning orientation in which a section of the platform 20, and particularly the inboard side of a section of the bumper rail 50 of a section of the platform 20, has automatically self-aligned to become parallel to and flush with the portion of the side 12 of a portion of the flatbed 10 by pivoting with respect to the direction of linear forward movement of the linear actuator 30. This pivoting movement occurs as the pivot pin 34 attached to the platform 20 rotates within the opening within the linkage 33 attached on the forward end of the linearly moveable member 31 of the linear actuator 30 as shown in FIG. 8 for example. Upon attaining the self-aligning orientation schematically represented in FIG. 6D, the limit switch 40 has opened the electrical circuit that powers the motor 32, which accordingly has stopped advancing the platform 20 toward the side 12 of the flatbed 10.

While the embodiments of the limit switches 40 discussed above were contact limit switches, in alternative embodiments of the present invention the limit switches 40 can be provided in the form of proximity sensors. Where the bumper rails 50 or the flatbeds 10 are made of metal for example, the proximity sensors can be of the inductive type. In some embodiments, proximity sensors can eliminate the need for bumper rails 50 altogether, A proximity sensor adjusted to a very short range is often known as a touch sensor, and proximity sensors adjustable to detect a graduated detection distance also are believed to be suitable to perform the function of the limit switch.

Moreover, some proximity sensors can be paired with a controller that operates the linear actuators 30 and can receive signals from the proximity sensors. The controller can be programmable, and those signals can be sent by the proximity sensors through electrical wires or wirelessly and as either analog or digital signals. For example, if the limit switches 40 shown in FIGS. 6A, 6B, 6C and 6D were provided in the form of proximity sensors, at least one limit switch 40 can be paired with one of the pivoting members 51 of the bumper rail 50 on one end of the platform 20 such that movement of the bumper rail 50 within a predetermined distance of the side of the platform 20 activates the proximity sensor limit switch 40 to send a signal to the controller for the linear actuator 30 associated with that respective end 21 or 22 of the platform 20. Upon receiving this signal from the proximity sensor limit switch 40, the controller in turn desirably is configured to stop operation of the electric motor 32 that is associated with that controller, thereby bringing to a halt the advance of that end 21 or 22 of the platform 20 toward the side 12 of the flatbed 10. The same arrangement of the limit switch 40 desirably is provided to at least one of the pivoting members 51 of the bumper rail 50 on the other end 21 or 22 of the platform 20. Once the respective controller receives the shut-off signal from the limit switch 40, when the motor 32 is operated in reverse so that the linear actuator 30 pulls the platform 20 back toward the motor 32 and the stanchion 28, the controller desirably is reset.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for facilitating loading and unloading access to a flatbed having an elongated support member that is defined by a pair of elongated opposed sides, the apparatus comprising:
   a. a platform elongated along a lengthwise axis and defining a first end and a second end axially opposite the first end, the platform further defining an upper surface configured to carry the weight of workers and cargo moving between the platform and the flatbed;
   b. a first linear actuator pivotally connected to the platform near the first end of the platform and configured to move linearly in a direction generally perpendicular to the lengthwise axis of the platform;
   c. a first limit switch carried by the platform near the first end of the platform and configured so that when triggered automatically by approach of the first end of the platform into flush contact with the side of the flatbed, movement of the first linear actuator stops, which stops movement of the first end of the platform associated with the first linear actuator toward the side of the flatbed;
   d. a second linear actuator pivotally connected to the platform near the second end of the platform and configured to move linearly in a direction generally perpendicular to the lengthwise axis of the platform;
   e. a second limit switch carried by the platform near the second end of the platform and configured so that when triggered automatically by approach of the second end of the platform into flush contact with the side of the flatbed, movement of the second linear actuator stops, which stops movement of the second end of the platform associated with the second linear actuator toward the side of the flatbed;
   wherein the platform defines an upper deck with an inboard side extending between the first end and the second end of the platform, the platform includes a first bumper disposed near the first end of the platform and configured so as to be resiliently pivotable with respect to the inboard side of deck; and
   wherein the first bumper is rendered resiliently pivotable by at least one pivoting member, the pivoting member having opposite ends and having one of its ends pivotally connected to the deck of the platform and the other of its ends pivotally connected to the bumper, wherein each end of the pivoting member is biased by a spring.

2. The apparatus of claim 1, wherein the first linear actuator includes a first electric motor, and the first limit switch is connected electrically in series with the first electric motor so as to stop operation of the first electric motor automatically upon activation of the first limit switch.

3. The apparatus of claim 2, wherein the second linear actuator includes a second electric motor, and the second limit switch is connected electrically in series with the second electric motor so as to stop operation of the second electric motor automatically upon activation of the second limit switch.

4. The apparatus of claim 1, wherein at least the first linear actuator includes a forward end defining a linkage that pivotally engages a pivot rod that is connected to the platform nearer the inboard side of the platform than the outboard side of the platform.

5. The apparatus of claim 1, wherein the platform defines an inboard side extending between the first end and the second end, and the platform includes a first bumper disposed near the first end of the platform with the first limit switch disposed between the inboard side of the platform and the first bumper.

6. The apparatus of claim 5, wherein the platform includes a second bumper disposed near the second end of the platform with the second limit switch disposed between the inboard side of the platform and the second bumper.

7. The apparatus of claim 1, wherein at least the first limit switch is formed by a contact limit switch.

8. The apparatus of claim 7, wherein at least the first limit switch includes a pivoting arm and a rotatable roller at one end of the pivoting arm.

9. The apparatus of claim 8, wherein the platform includes an upper deck that is carried by a frame that is rendered mobile by a plurality of wheels, which are rotatably carried by the frame.

10. The apparatus of claim 8, wherein the at least one of the linear actuators is a reversible screw jack.

11. The apparatus of claim 8, wherein the at least one of the linear actuators is a reversible scissors jack.

12. The apparatus of claim 8, wherein the at least one of the linear actuators is powered by a reversible electric motor.

13. The apparatus of claim 8, wherein the platform is carried by a frame that includes a height adjusting mechanism that is configured to permit the user to raise and lower the elevation of the platform.

14. The apparatus of claim 13, wherein the platform is carried by a frame that is rendered mobile by a plurality of wheels, which are rotatably carried by the frame.

* * * * *